United States Patent
Majima et al.

(10) Patent No.: US 12,508,767 B2
(45) Date of Patent: Dec. 30, 2025

(54) METHOD OF MANUFACTURING THREE-DIMENSIONAL SHAPED OBJECT, AND THREE-DIMENSIONAL SHAPING SYSTEM

(71) Applicant: SEIKO EPSON CORPORATION, Tokyo (JP)

(72) Inventors: Atsushi Majima, Nagano (JP); Kohei Adachi, Nagano (JP); Masaaki Ogihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 88 days.

(21) Appl. No.: 18/170,617

(22) Filed: Feb. 17, 2023

(65) Prior Publication Data

US 2023/0264425 A1 Aug. 24, 2023

(30) Foreign Application Priority Data

Feb. 21, 2022 (JP) ................. 2022-024402

(51) Int. Cl.
| | | |
|---|---|---|
| *B29C 64/106* | (2017.01) | |
| *B22F 10/22* | (2021.01) | |
| *B22F 10/30* | (2021.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC ............ *B29C 64/106* (2017.08); *B22F 10/22* (2021.01); *B22F 10/30* (2021.01); *B29C 64/393* (2017.08); *B33Y 10/00* (2014.12); *B33Y 30/00* (2014.12); *B33Y 50/02* (2014.12)

(58) Field of Classification Search
CPC ... B29C 64/106; B29C 64/118; B29C 64/386; B29C 64/393; B22F 10/22; B22F 10/30; B33Y 10/00; B33Y 50/02
See application file for complete search history.

(56) References Cited

U.S. PATENT DOCUMENTS

| | | | |
|---|---|---|---|
| 11,077,619 B2 | 8/2021 | Yuwaki et al. | |
| 11,413,809 B2 | 8/2022 | Hashimoto et al. | |
| 11,413,824 B2 | 8/2022 | Yamazaki | |

(Continued)

FOREIGN PATENT DOCUMENTS

| | | |
|---|---|---|
| CN | 108081616 A | 5/2018 |
| CN | 111231306 A | 6/2020 |

(Continued)

*Primary Examiner* — Jerzi H Moreno Hernandez
(74) *Attorney, Agent, or Firm* — Global IP Counselors, LLP

(57) ABSTRACT

A method of manufacturing a three-dimensional shaped object includes a first process of determining a moving speed of a discharge part in each of a plurality of partial paths based on an arrangement of endpoints representing a start point and an end point of the plurality of partial paths, the arrangement of the endpoints being included in path information in which a movement path in which the discharge part moves while discharging a shaping material toward a stage is indicated by the plurality of partial paths, and a second process of discharging the shaping material from the discharge part while moving the discharge part at the determined moving speed to laminate layers.

8 Claims, 7 Drawing Sheets

(56) References Cited

U.S. PATENT DOCUMENTS

| | | | |
|---|---|---|---|
| 11,472,121 B2 | 10/2022 | Yuwaki et al. | |
| 11,850,801 B2 | 12/2023 | Yuwaki et al. | |
| 12,220,859 B2 | 2/2025 | Hashimoto et al. | |
| 2014/0371895 A1* | 12/2014 | Sadusk | B33Y 10/00 700/98 |
| 2017/0239884 A1* | 8/2017 | Batchelder | B29C 64/20 |
| 2018/0186091 A1* | 7/2018 | Wu | B29C 64/118 |
| 2018/0339457 A1 | 11/2018 | Fujimaki et al. | |
| 2020/0122407 A1 | 4/2020 | Yamazaki | |
| 2020/0164589 A1* | 5/2020 | Yuwaki | B22F 12/57 |
| 2020/0406531 A1* | 12/2020 | Hashimoto | B29C 64/209 |
| 2021/0178701 A1 | 6/2021 | Yuwaki et al. | |
| 2022/0234280 A1 | 7/2022 | Hashimoto et al. | |
| 2022/0347935 A1 | 11/2022 | Yuwaki et al. | |

FOREIGN PATENT DOCUMENTS

| | | | |
|---|---|---|---|
| CN | 112140531 A | | 12/2020 |
| CN | 113882677 A | * | 1/2022 |
| JP | 2006-192710 A | | 7/2006 |
| JP | 6310614 B1 | | 4/2018 |
| JP | 2020-062797 A | | 4/2020 |
| JP | 2021-006375 A | | 1/2021 |

\* cited by examiner

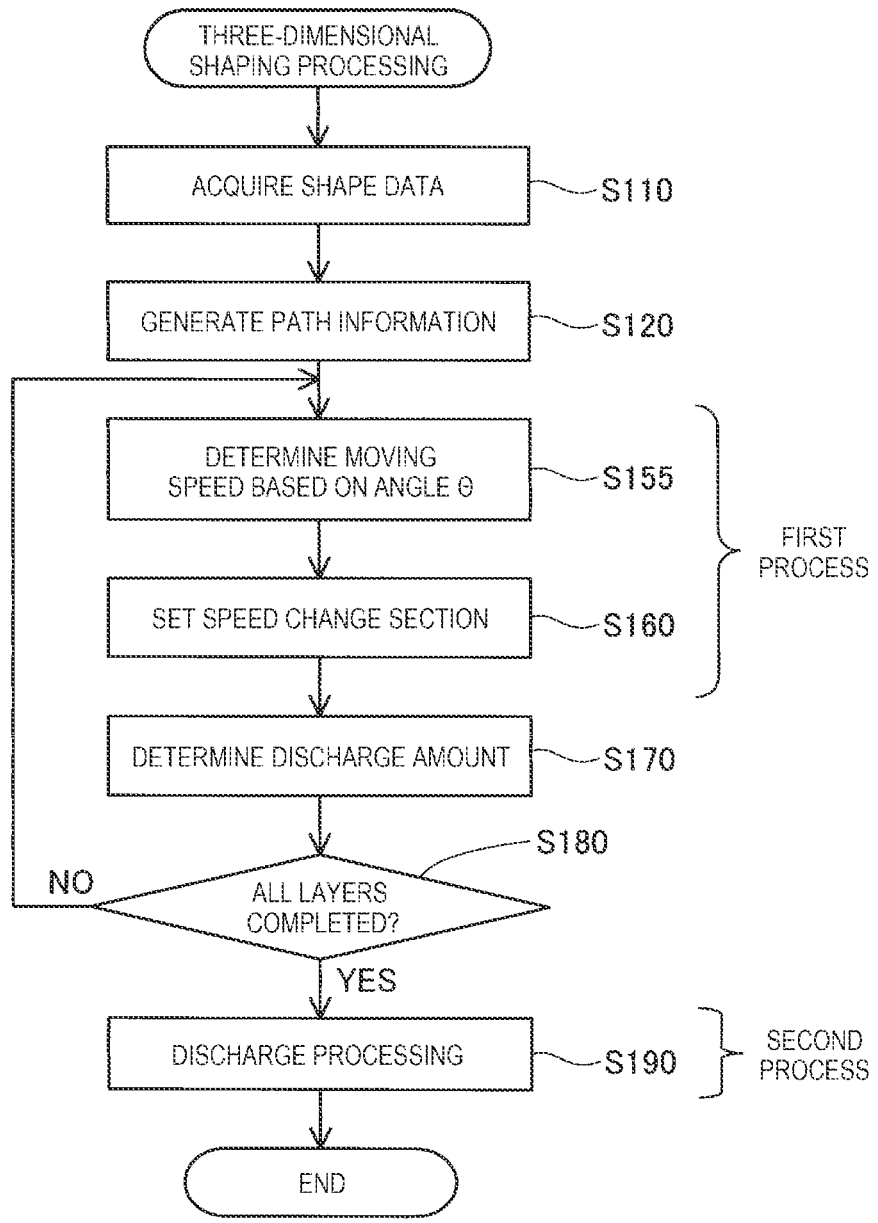

METHOD OF MANUFACTURING THREE-DIMENSIONAL SHAPED OBJECT, AND THREE-DIMENSIONAL SHAPING SYSTEM

The present application is based on, and claims priority from JP Application Serial Number 2022-024402, filed Feb. 21, 2022, the disclosure of which is hereby incorporated by reference herein in its entirety

BACKGROUND

1. Technical Field

The present disclosure relates to a method of manufacturing a three-dimensional shaped object, and a three-dimensional shaping system.

2. Related Art

JP-A-2006-192710 (Patent Literature 1) discloses a technique in which a molten thermoplastic material is extruded onto a base from an extrusion nozzle that performs scanning in accordance with preset shape data, and a molten material is further laminated on the material cured on the base, thereby forming a three-dimensional object.

Patent Literature 1 does not disclose determination of a scanning speed of the extrusion nozzle. The scanning speed affects shaping time and shaping accuracy of three-dimensional shaping. For example, in general, when the scanning speed is made lower, the shaping accuracy is improved, but the shaping time is increased. In addition, when the scanning speed is too high in a case of shaping a curved portion of a three-dimensional object, the extrusion nozzle does not follow the curved portion and deviates from an assumed trajectory, and the shaping accuracy may decrease. Therefore, a technique for appropriately determining a scanning speed has been desired.

SUMMARY

According to a first aspect of the present disclosure, a method of manufacturing a three-dimensional shaped object is provided. The method of manufacturing a three-dimensional shaped object includes: a first process of determining a moving speed of a discharge part in each of a plurality of partial paths based on an arrangement of endpoints representing a start point and an end point of the plurality of partial paths, the arrangement of the endpoints being included in path information in which a path in which the discharge part moves while discharging a shaping material toward a stage is indicated by the plurality of partial paths; and a second process of discharging the shaping material from the discharge part in accordance with the determined moving speed to laminate layers.

According to a second aspect of the present disclosure, a three-dimensional shaping system is provided. The three-dimensional shaping system includes: a stage; a discharge part configured to discharge a shaping material toward the stage; a moving mechanism configured to change a relative position between the discharge part and the stage; and a control part. The control part executes first processing of determining a moving speed of the discharge part in each of a plurality of partial paths based on an arrangement of endpoints representing a start point and an end point of the plurality of partial paths, the arrangement of the endpoints being included in path information in which a path in which the discharge part moves while discharging the shaping material is indicated by the plurality of partial paths, and second processing of discharging the shaping material from the discharge part in accordance with the determined moving speed to laminate layers.

BRIEF DESCRIPTION OF THE DRAWINGS

FIG. 8 is a flowchart of three-dimensional shaping processing according to a second embodiment.

DESCRIPTION OF EXEMPLARY EMBODIMENTS

A. First Embodiment

Figure 1:
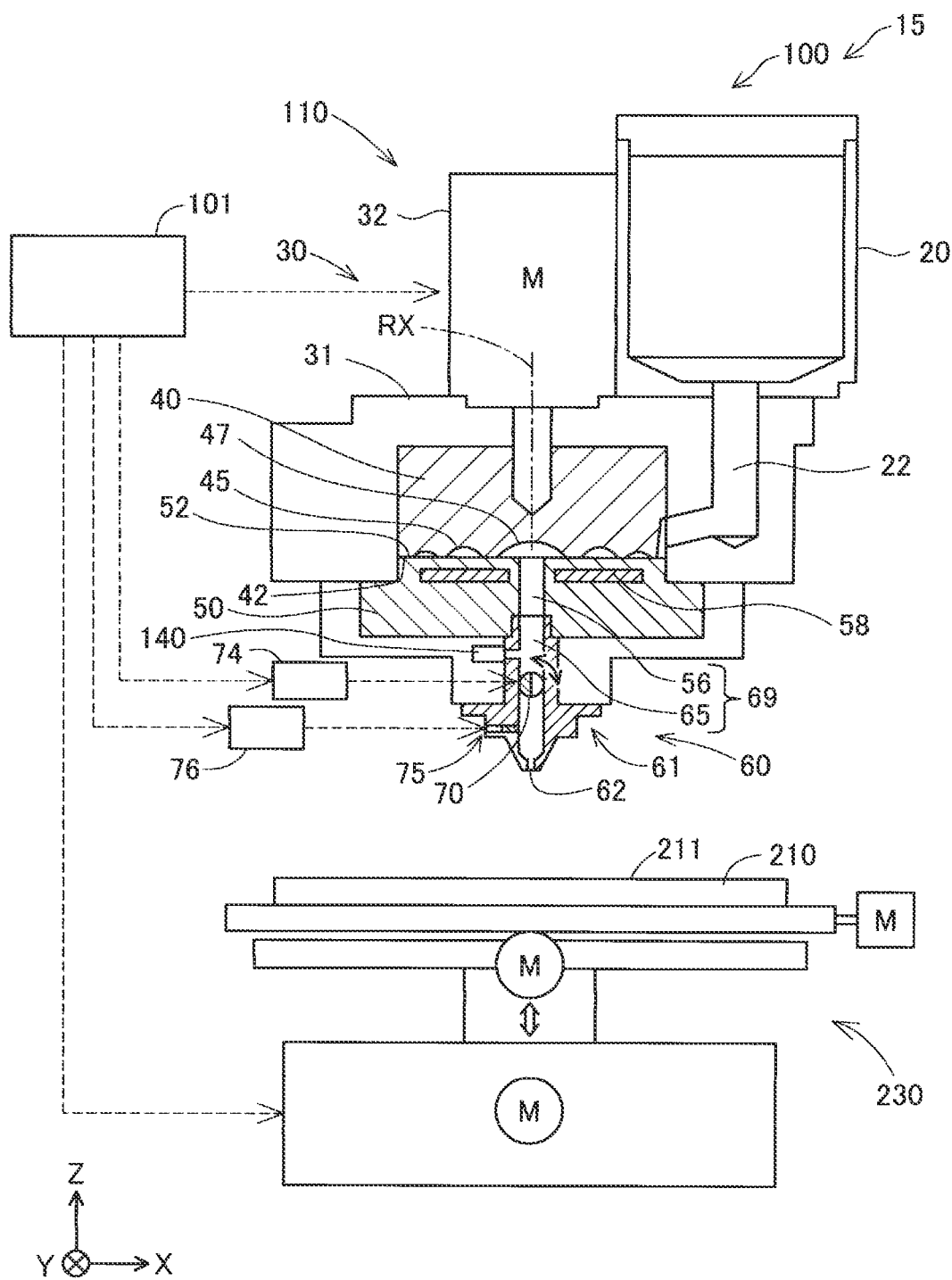
FIG. 1 is a diagram illustrating a schematic configuration of a three-dimensional shaping system according to a first embodiment.

FIG. 1 is a diagram illustrating a schematic configuration of a three-dimensional shaping system 15 according to a first embodiment. In FIG. 1, arrows indicating X, Y, and Z directions orthogonal to one another are shown. The X direction and the Y direction are directions parallel to a horizontal plane, and the Z direction is a direction along a vertically upward direction. The arrows indicating the X, Y, and Z directions are also appropriately shown in other drawings such that the shown directions correspond to those in FIG. 1. When it comes to specifying a direction in the following description, a direction indicated by an arrow in each drawing is referred to as "+", a direction opposite thereto is referred to as "−", and positive and negative signs are used in combination in direction notation. Hereinafter, a +Z direction is referred to as "upper", and a −Z direction is referred to as "lower".

The three-dimensional shaping system 15 includes a three-dimensional shaping device 100 and a control part 101 that controls the three-dimensional shaping device 100. In the embodiment, the control part 101 is provided in the three-dimensional shaping device 100. The three-dimensional shaping device 100 includes a shaping part 110 that generates and discharges a shaping material, a shaping stage 210 as a base for a three-dimensional shaped object, and a moving mechanism 230 that controls a discharge position of the shaping material. The three-dimensional shaping device 100 may be accommodated in a chamber (not illustrated).

Under the control of the control part 101, the shaping part 110 discharges a paste-like shaping material, which is obtained by melting a material in a solid state, onto the stage 210. The shaping part 110 includes a material supply part 20 that is a supply source of the material before being converted into the shaping material, a plasticizing part 30 that generates the shaping material by converting the material into the shaping material, and a discharge part 60 that discharges the shaping material toward the stage 210. The shaping part 110 is also referred to as a head.

The material supply part 20 supplies the material for generating the shaping material to the plasticizing part 30. The material supply part 20 is implemented by, for example, a hopper that accommodates the material. The material supply part 20 has a discharge port on a lower side. The discharge port is coupled to the plasticizing part 30 via a supply path 22. The material is put into the material supply part 20 in a form of pellets, powder, or the like. In the embodiment, a material of a pellet-shaped ABS resin is used.

The plasticizing part 30 includes a screw case 31, a drive motor 32, a screw 40, a barrel 50, and a heater 58. The plasticizing part 30 plasticizes at least a part of the material supplied from the material supply part 20, generates the paste-like shaping material having fluidity, and supplies the shaping material to the discharge part 60. "Plasticizing" is a concept including melting, and refers to changing from a solid state to a state of presenting fluidity. Specifically, in a case of a material in which glass transition occurs, the "plasticizing" refers to setting a temperature of the material to be equal to or higher than a glass transition point. In a case of a material in which the glass transition does not occur, the "plasticizing" refers to setting a temperature of the material to be equal to or higher than a melting point thereof.

Figure 2:
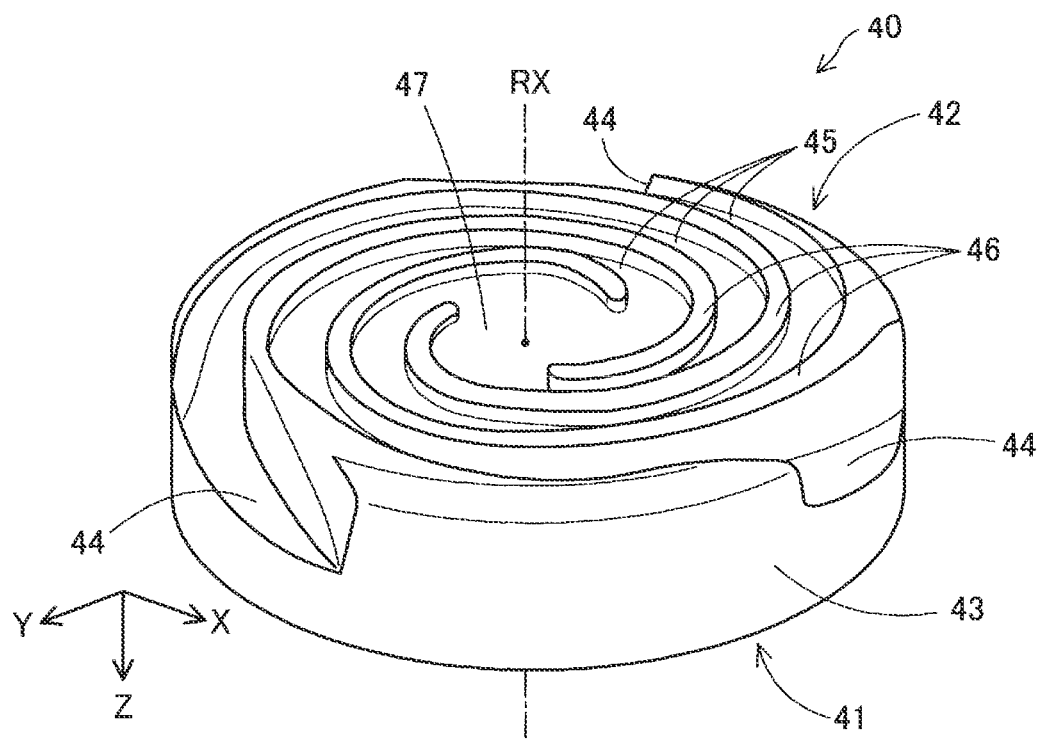
FIG. 2 is a perspective view illustrating a schematic configuration of a screw.

FIG. 2 is a perspective view illustrating a schematic configuration of the screw 40. The screw 40 has a substantially cylindrical shape in which a height in an axial direction that is a direction along a central axis RX of the screw 40 is smaller than a diameter thereof. The screw 40 is disposed such that the central axis RX, which is a rotation center thereof, is parallel to the Z direction. The screw 40 may be referred to as a flat screw, a scroll, or a rotor.

As illustrated in FIG. 1, the screw 40 is accommodated in the screw case 31. As illustrated in FIGS. 1 and 2, the screw 40 has a groove forming surface 42 in which grooves 45 are formed. In the embodiment, the groove forming surface 42 is constituted by a lower surface of the screw 40. An upper surface side of the screw 40 is coupled to the drive motor 32, and the screw 40 is rotated in the screw case 31 by a rotational driving force generated by the drive motor 32. The drive motor 32 performs driving under control of the control part 101. The screw 40 may be driven by the drive motor 32 via a speed reducer.

As illustrated in FIG. 2, the grooves 45 presenting a spiral shape are formed in the groove forming surface 42. The supply path 22 of the material supply part 20 communicates with the grooves 45 from a side surface of the screw 40. The grooves 45 are continuous to a material introduction port 44 formed in the side surface of the screw 40. The material introduction port 44 is a portion for receiving a material supplied via the supply path 22 of the material supply part 20. As illustrated in FIG. 2, in the embodiment, three grooves 45 are formed so as to be separated from each other by ridge portions 46. The number of the grooves 45 is not limited to three, and may be one or two or more. A shape of the grooves 45 is not limited to a spiral shape, and may be a helical shape or an involute curve shape, or may be a shape extending in an arc from a central portion 47 toward an outer periphery.

Figure 3:
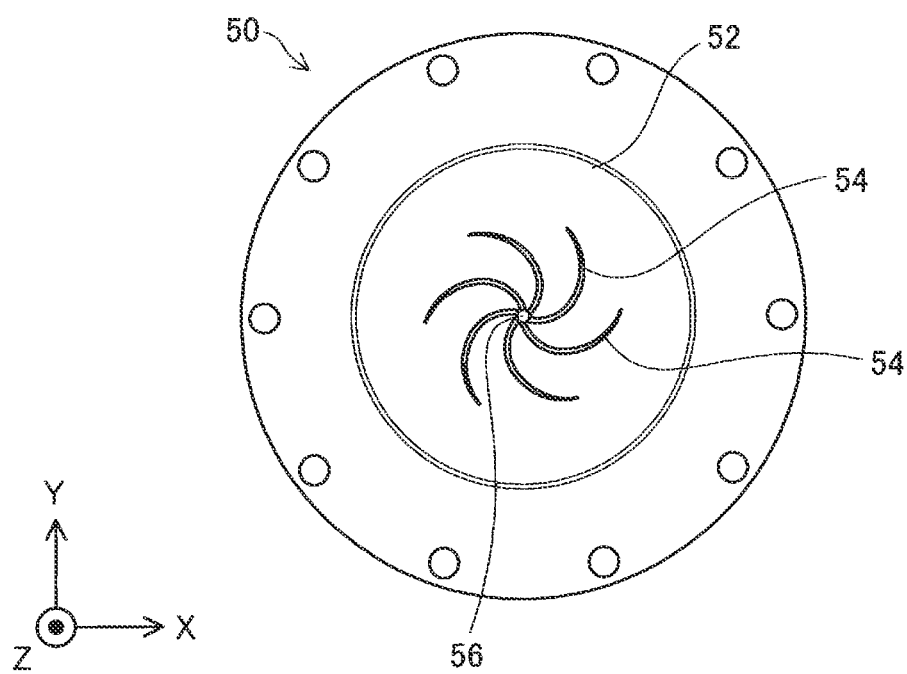
FIG. 3 is a plan view illustrating a schematic configuration of a barrel.

FIG. 3 is a plan view illustrating a schematic configuration of the barrel 50. As illustrated in FIG. 1, in the embodiment, the barrel 50 is disposed below the screw 40. As illustrated in FIGS. 1 and 3, the barrel 50 has a facing surface 52 facing the groove forming surface 42 of the screw 40. In the embodiment, the facing surface 52 is constituted by an upper surface of the barrel 50. The facing surface 52 and the groove forming surface 42 face each other in the Z direction, and a space is defined between the facing surface 52 and the grooves 45 of the groove forming surface 42. The barrel 50 is provided with a communication hole 56 communicating with a nozzle 61 of the discharge part 60 described later on the central axis RX of the screw 40. The heater 58 is built in the barrel 50 at a position facing the grooves 45 of the screw 40. A temperature of the heater 58 is controlled by the control part 101.

As illustrated in FIG. 3, a plurality of guide grooves 54 are formed around the communication hole 56 in the facing surface 52. The guide grooves 54 each have one end coupled to the communication hole 56, and extend from the communication hole 56 toward an outer periphery of the facing surface 52, presenting a spiral shape. Each of the guide grooves 54 has a guiding a shaping material to the communication hole 56. One end of each of guide grooves 54 may not be coupled to the communication hole 56. The guide grooves 54 may not be formed in the barrel 50.

The material supplied into the grooves 45 of the screw 40 flows along the grooves 45 by the rotation of the screw 40 while being melted in the grooves 45, and is guided to the central portion 47 of the screw 40 as the shaping material. The paste-like shaping material flowing into the central portion 47 and exhibiting fluidity is supplied to the nozzle 61 through the communication hole 56. All types of substances constituting the shaping material may not be melted, and at least a part of the types of substances constituting the shaping material may be melted so that the shaping material is converted into a state of having fluidity as a whole.

The discharge part 60 includes the nozzle 61 for discharging the shaping material. The nozzle 61 includes a nozzle flow path 65 and a tip surface 63 provided with a nozzle opening 62. The nozzle flow path 65 is a flow path of the shaping material, is formed in the nozzle 61, and is coupled to the communication hole 56 of the barrel 50. The tip end surface 63 is a surface constituting a tip end portion of the nozzle 61 that protrudes in the −Z direction toward a shaping surface 211. The nozzle opening 62 is a portion that is provided at an end portion of the nozzle flow path 65 on a side communicating with the atmosphere, and in which a flow path cross section of the nozzle flow path 65 is reduced. The shaping material generated by the plasticizing part 30 is supplied to the nozzle 61 through the communication hole 56, and is discharged from the nozzle opening 62 through the nozzle flow path 65.

Hereinafter, a flow path, which is provided in the three-dimensional shaping system 15 and through which the shaping material flows, may be collectively referred to as a flow path 69. In the embodiment, the flow path 69 includes the communication hole 56 and the nozzle flow path 65.

The discharge part 60 in the embodiment includes a flow rate adjustment mechanism 70 and a pressure adjustment part 75 in addition to the nozzle 61. The flow rate adjustment mechanism 70 adjusts an amount of the shaping material flowing through the flow path 69. The pressure adjustment part 75 adjusts a pressure in the flow path 69.

The flow rate adjustment mechanism 70 in the embodiment is provided in the nozzle flow path 65, and is implemented by a butterfly valve. The flow rate adjustment mechanism 70 changes an opening degree of the nozzle flow path 65 by rotating in the nozzle flow path 65. The flow rate adjustment mechanism 70 is driven by a first drive part 74 under the control of the control part 101. The first drive part 74 is implemented by, for example, a stepping motor. The control part 101 controls a rotation angle of the butterfly valve by using the first drive part 74 to adjust the amount of the shaping material flowing through the flow path 69. Accordingly, a flow rate of the shaping material flowing from the plasticizing part 30 to the nozzle 61 of the discharge part 60 can be adjusted, and a flow rate of the shaping material discharged from the nozzle 61 can be adjusted. The flow rate adjustment mechanism 70 adjusts the flow rate of the shaping material and controls ON/OFF of outflow of the shaping material. In another embodiment, the flow rate adjustment mechanism 70 may not be implemented by a butterfly valve, and may be implemented as a valve mechanism that changes an opening degree of the flow path 69 by translational movement of a valve, for example.

The pressure adjustment part 75 in the embodiment is implemented by a plunger, and is coupled between the flow rate adjustment mechanism 70 and the nozzle opening 62 in the nozzle flow path 65. The pressure adjustment part 75 performs a suction operation of sucking the shaping material in the nozzle flow path 65 by retracting the plunger in a direction away from the nozzle flow path 65. In addition, the pressure adjustment part 75 performs a discharge operation of pushing out the sucked shaping material toward the nozzle opening 62 by advancing the plunger in a direction approaching the nozzle flow path 65. The pressure adjustment part 75 is driven by a second drive part 76 under the control of the control part 101. The second drive part 76 is implemented by, for example, a stepping motor, or a rack-and-pinion mechanism that converts a rotational force of a stepping motor into a translational motion of a plunger. In addition, in another embodiment, the pressure adjustment part 75 may be implemented as, for example, a piston pump that performs a suction operation or a discharge operation by an operation of a piston.

When the suction operation is performed, since the shaping material in the nozzle flow path 65 is sucked toward the pressure adjustment part 75, the pressure in the nozzle flow path 65 decreases. When the discharge operation is performed, since the shaping material is discharged from the pressure adjustment part 75 toward the nozzle flow path 65, the pressure in the nozzle flow path 65 increases. In this way, the pressure adjustment part 75 adjusts the pressure in the flow path 69.

The pressure adjustment part 75 may be used not only to adjust the pressure in the flow path 69, but also to prevent, by the suction operation, a tailing phenomenon in which the shaping material drips from the nozzle opening 62 so as to form a thread, for example. In this case, the control part 101 can more effectively prevent the tailing phenomenon by performing the suction operation after the opening degree of the nozzle flow path 65 is set to 0 by the flow rate adjustment mechanism 70. In addition, the pressure adjustment part 75 may be used to improve responsiveness in delivering the shaping material from the nozzle 61 by the discharge operation. In this case, the control part 101 executes the discharge operation before the opening degree of the nozzle flow path 65 is set to be larger than 0 by the flow rate adjustment mechanism 70, and thus it is possible to further improve the responsiveness in delivering the shaping material.

In the embodiment, a pressure sensor 140 that detects the pressure in the flow path 69 is provided at the flow path 69. The pressure sensor 140 in the embodiment is implemented by a diaphragm type pressure sensor. In the embodiment, the pressure sensor 140 is coupled to the nozzle flow path 65 upstream of the flow rate adjustment mechanism 70, and detects a pressure on an upstream side of the flow rate adjustment mechanism 70 in the nozzle flow path 65. In another embodiment, the pressure sensor 140 may be implemented by, for example, a piezoelectric pressure sensor. For example, the pressure sensor 140 may detect a pressure on a downstream side of the flow rate adjustment mechanism 70 in the nozzle flow path 65, or may detect a pressure in the communication hole 56.

The stage 210 is disposed at a position facing the nozzle opening 62 of the nozzle 61. In the first embodiment, the shaping surface 211 of the stage 210 facing the nozzle opening 62 of the nozzle 61 is disposed so as to be parallel to the X and Y directions, that is, horizontal directions. In three-dimensional shaping processing described later, the three-dimensional shaping device 100 shapes a three-dimensional shaped object by discharging the shaping material from the discharge part 60 toward the shaping surface 211 of the stage 210 and laminating layers thereon. The stage 210 may be provided with a heater for preventing rapid cooling of the shaping material discharged onto the stage 210.

The moving mechanism 230 changes a relative position between the stage 210 and the discharge part 60. In the embodiment, a position of the discharge part 60 is fixed, and the moving mechanism 230 moves the stage 210. The moving mechanism 230 is implemented by a three-axis positioner that moves the stage 210 in three-axis directions of the X, Y, and Z directions by driving forces of three motors. The moving mechanism 230 changes a relative positional relationship between the discharge part 60 and the stage 210 under the control of the control part 101. Thereby, a relative positional relationship between the nozzle 61 and the stage 210 is changed. In the present specification, unless otherwise specified, movement of the nozzle 61 and the discharge part 60 means that the nozzle 61 and the discharge part 60 are moved relatively to the stage 210. Hereinafter, a moving speed of the discharge part 60 relative to the stage 210 is also referred to as a moving speed of the discharge part 60 or simply as a "moving speed". In the embodiment, the moving speed of the discharge part 60 is synonymous with a moving speed of the nozzle 61.

In another embodiment, instead of the configuration in which the stage 210 is moved by the moving mechanism 230, a configuration in which the moving mechanism 230 moves the discharge part 60 with respect to the stage 210 in a state in which a position of the stage 210 is fixed may be adopted. Further, a configuration in which the moving mechanism 230 moves the stage 210 in the Z direction, and moves the discharge part 60 in the X and Y directions, or a configuration in which the moving mechanism 230 moves the stage 210 in the X and Y directions, and moves the discharge part 60 in the Z direction may be adopted. Even with these configurations, it is possible to change the relative positional relationship between the discharge part 60 and the stage 210, that is, the relative positional relationship between the nozzle 61 and the stage 210.

The control part 101 is a control device that controls an overall operation of the three-dimensional shaping device 100. The control part 101 is implemented by a computer that includes one or a plurality of processors, a storage device, and an input and output interface for inputting and outputting signals from and to an outside. The control part 101 exerts various functions by the processor executing a program or a command read into the storage device, such as a function of executing the three-dimensional shaping processing to be described later. Instead of being implemented by the computer, the control part 101 may be implemented by a configuration in which a plurality of circuits for implementing at least a part of the functions are combined.

The control part 101 performs three-dimensional shaping processing to shape a three-dimensional shaped object. In the three-dimensional shaping processing, the control part 101 controls the shaping part 110, which includes the plasticizing part 30 and the discharge part 60, and the moving mechanism 230 based on shaping data to shape a three-dimensional shaped object on the stage 210.

The shaping data includes path information and discharge amount information. The path information is information in which a movement path of the discharge part 60 is represented by a plurality of linear partial paths. The movement path of the discharge part 60 is a path along which the discharge part 60 moves along the shaping surface 211 of the stage 210 while discharging the shaping material toward the stage 210. More specifically, in the embodiment, the movement path of the discharge part 60 refers to a movement path of the nozzle 61. The path information includes information related to an arrangement of endpoints of a plurality of partial paths. The endpoint is a point representing a start point and an end point of a partial path. Two partial paths that are continuous with each other share one endpoint. For example, when there are two partial paths that are continuous with each other, an end point of one partial path that the nozzle 61 reaches earlier is also a start point of the other partial path that the nozzle 61 reaches later.

The discharge amount information is information indicating discharge amounts of the shaping material in respective movement paths. The discharge amount information is associated with the partial paths separately. In the embodiment, a discharge amount indicated by the discharge amount information is the amount of the shaping material to be discharged per unit time in a corresponding partial path.

Figure 4:
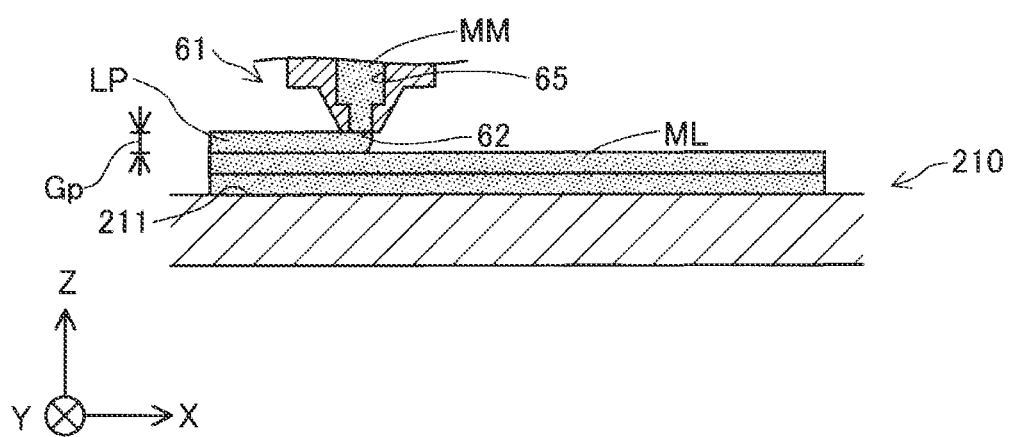
FIG. 4 is a diagram schematically illustrating a state where a three-dimensional shaped object is being shaped.

FIG. 4 is a diagram schematically illustrating a state where a three-dimensional shaped object is being shaped in the three-dimensional shaping device 100. In the three-dimensional shaping device 100, as described above, in the plasticizing part 30, the solid material supplied to the grooves 45 of the rotating screw 40 is melted and a shaping material MM is generated. The control part 101 causes the nozzle 61 to discharge the shaping material MM while changing the position of the nozzle 61 with respect to the stage 210 in a direction along the shaping surface 211 of the stage 210, with a distance maintained constant between the shaping surface 211 of the stage 210 and the nozzle 61. The shaping material MM discharged from the nozzle 61 is continuously deposited in a moving direction of the nozzle 61. By performing scanning with the nozzle 61, a linear portion LP, which is a shaping portion linearly extending along a scanning path of the nozzle 61, is shaped.

The control part 101 forms layers ML by repeating the scanning with the nozzle 61. The control part 101 moves the position of the nozzle 61 with respect to the stage 210 in the Z direction after one layer ML is formed. Then, the layer ML is further laminated on the layers ML formed so far, thereby shaping the three-dimensional shaped object.

In laminating the layers of the shaping material, the control part 101 causes the nozzle 61 to discharge the shaping material while maintaining a distance between the nozzle 61 and a discharge target. The discharge target is the shaping surface 211 when discharging the shaping material onto the shaping surface 211, and is an upper surface of the discharged shaping material when discharging the shaping material onto the discharged shaping material. The distance between the nozzle 61 and the discharge target may be referred to as a gap Gp.

A width of the linear portion LP is also referred to as a line width, and a height of the linear portion LP is also referred to as a lamination pitch. In the example in FIG. 4, the line width corresponds to a dimension of the linear portion LP in the Y direction, and the lamination pitch corresponds to a dimension of the linear portion LP in the Z direction. The line width and the lamination pitch are determined by a size of the gap Gp and the amount of the shaping material discharged from the nozzle 61 per unit movement amount. For example, when the gap Gp is small, the shaping material discharged from the nozzle 61 is more pressed against the discharge target by the nozzle 61 than when the gap Gp is large, and thus the lamination pitch is small and the line width is large. The amount of the shaping material discharged from the nozzle 61 per unit movement amount is determined by the moving speed of the nozzle 61 and the amount of the shaping material discharged from the nozzle 61 per unit time. The amount of the shaping material discharged from the nozzle 61 per unit time is determined by, for example, a size of the nozzle opening 62, a flow rate of the shaping material flowing in the flow path 69, and a pressure in the flow path 69.

Figure 5:
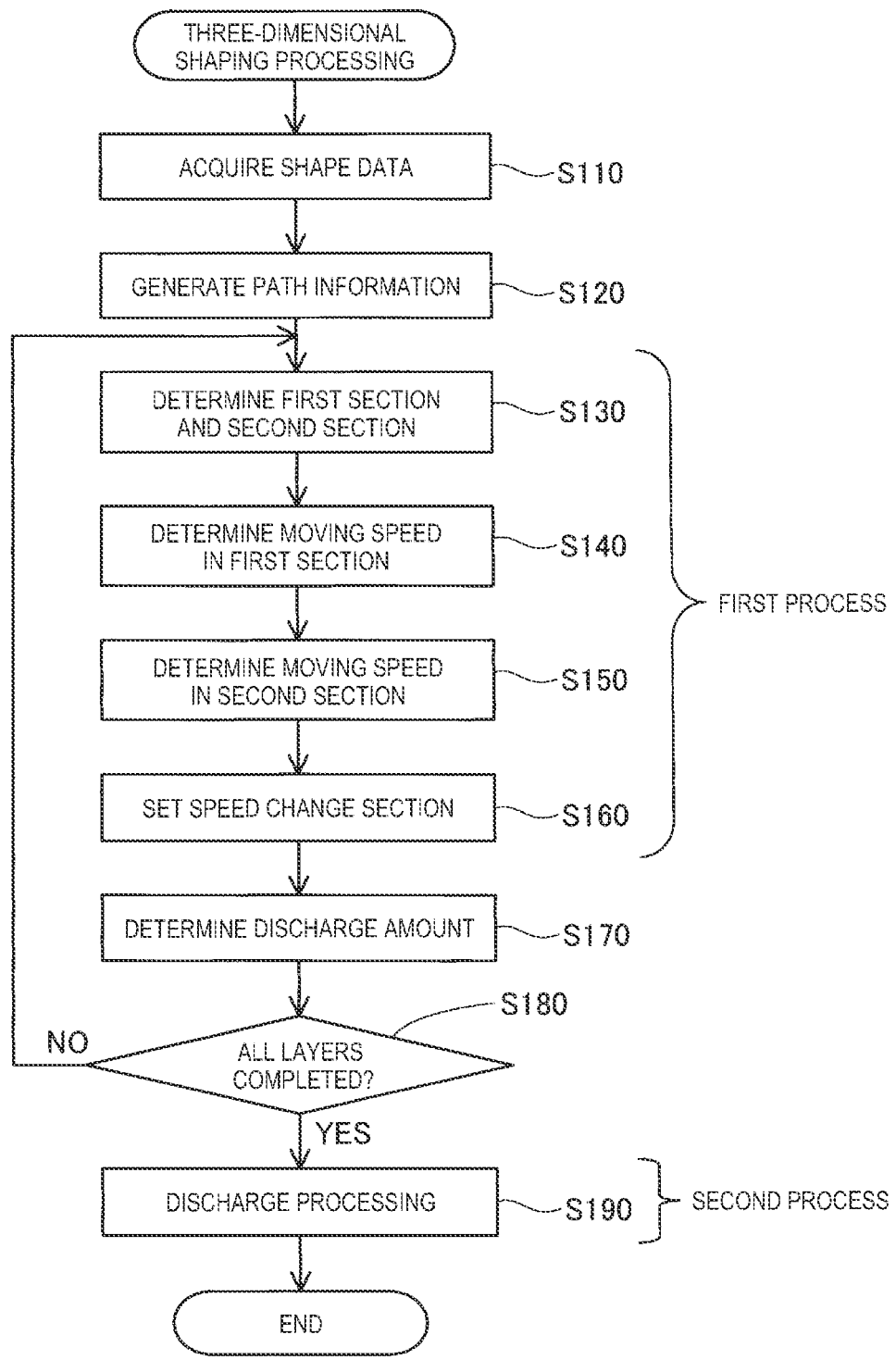
FIG. 5 is a flowchart of three-dimensional shaping processing according to the first embodiment.

FIG. 5 is a flowchart of three-dimensional shaping processing for implementing a method of manufacturing a three-dimensional shaped object according to the embodiment. First, in step S110, the control part 101 acquires shape data indicating a shape of a three-dimensional shaped object from an external computer, a recording medium, or the like. The control part 101 acquires the shape data such as three-dimensional CAD data from the outside through a network or a recording medium, for example.

Next, in step S120, based on three-dimensional data acquired in step S110, the control part 101 generates path information including a plurality of partial paths for shaping the three-dimensional shaped object indicated by the three-dimensional data.

In steps S130 to S160, the control part 101 executes first processing. The first processing refers to processing of determining moving speeds in respective partial paths based on arrangement of endpoints of the plurality of partial paths included in the path information. A process of determining moving speeds in respective partial paths based on arrangement of endpoints of the plurality of partial paths included in the path information as in steps S130 to S160 is also referred to as a first process.

Figure 6:
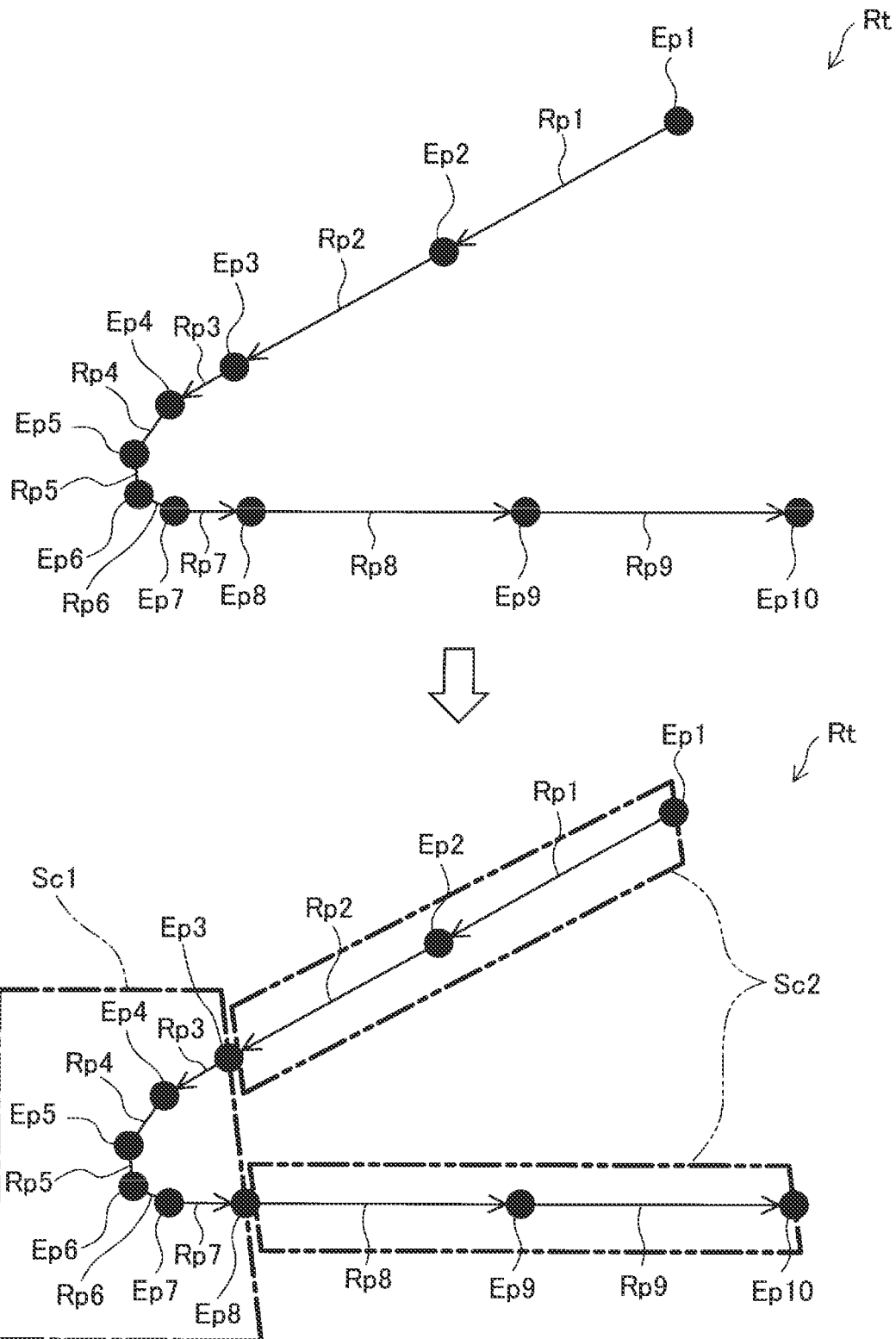
FIG. 6 is a diagram illustrating first processing.

FIG. 6 is a diagram illustrating the first processing. FIG. 6 illustrates an example of a movement path Rt indicated by the path information. The movement path Rt indicates a movement path for shaping a certain layer of the three-dimensional shaped object. The movement path Rt is indicated by partial paths Rp1 to Rp9 that are sequentially continuous. In addition, in FIG. 6, endpoints Ep1 to Ep10 of the partial paths included in the path information are illustrated. For example, the endpoint Ep1 is a start point of the partial path Rp1. The endpoint Ep2 is an end point of the partial path Rp1 and is a start point of the partial path Rp2. The endpoint Ep1 is a starting end of the entire movement path Rt, and the endpoint Ep10 is an end of the entire movement path Rt. That is, the movement path Rt is a path leading from the endpoint Ep1 to the endpoint Ep10.

In step S130 in FIG. 5, the control part 101 determines a first section Sc1 and a second section Sc2 of the movement path Rt, as illustrated in a lower part of FIG. 6. In the embodiment, the first section Sc1 refers to a section in which the discharge part 60 moves while changing a direction thereof. The second section Sc2 refers to a section in which the discharge part 60 moves linearly without changing the direction thereof. The control part 101 determines, as the first section Sc1, a portion of the movement path Rt in which partial paths having different directions are adjacent to each other, and determines, as the second section Sc2, a partial path other than the first section Sc1. When a moving direction of the discharge part 60 in a certain partial path is the same as a moving direction of the discharge part 60 in another partial path, the directions of the partial paths are the same. In the example in FIG. 7, the partial paths Rp3 to Rp7 are determined as the first section Sc1, and the partial paths Rp1, Rp2, Rp8, and Rp9 are determined as the second section Sc2.

In another embodiment, in step S130, for example, the control part 101 may determine, as the first section Sc1, a section in which an angle θ formed by partial paths continuous with each other is equal to or smaller than a predetermined angle, and determine, as the second section Sc2, a section in which the angle θ exceeds the predetermined angle. The angle θ has a value greater than 0° and equal to or smaller than 180°. When the angle θ is 180°, the discharge part 60 moves in two partial paths forming the angle θ without changing a direction thereof. As the angle θ is closer to 0°, the discharge part 60 needs to change an angle of the moving direction thereof more greatly when moving from one partial path to the other partial path, the two partial paths forming the angle θ.

In step S140, the control part 101 determines a moving speed in the first section Sc1. In the embodiment, in step S140, based on a radius of a circumscribed circle circumscribing at least three consecutive endpoints on the movement path Rt, the control part 101 determines a moving speed in partial paths coupling the endpoints in contact with the circumscribed circle. For example, in FIG. 7, the endpoints Ep3, Ep4, and Ep5 of the partial path Rp3 and the partial path Rp4, which are two partial paths continuous with each other, are three consecutive endpoints on the movement path Rt.

Figure 7:
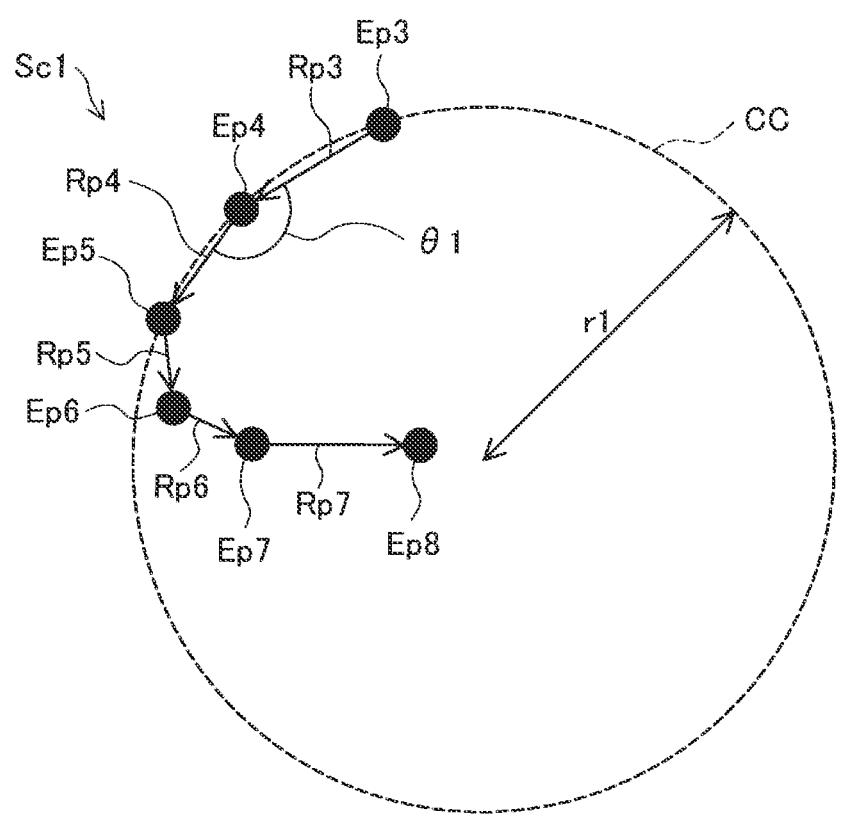
FIG. 7 is a diagram illustrating determination of a moving speed of a discharge part in a first section.

FIG. 7 is a diagram illustrating the determination of the moving speed of the discharge part 60 in the first section Sc1. In FIG. 7, the partial paths Rp3 to Rp7 determined as the first section Sc1 of the movement path Rt illustrated in FIG. 6 are illustrated. In addition, in FIG. 7, a circumscribed circle CC that circumscribes the endpoints Ep3, Ep4, and Ep5 is illustrated. More specifically, the circumscribed circle CC represents a circumscribed circle that circumscribes a triangle having the endpoints Ep3 to Ep5 as vertexes.

In the embodiment, the control part 101 determines the moving speed of the discharge part 60 in the partial path Rp3 based on a radius of the circumscribed circle CC illustrated in FIG. 7. More specifically, the control part 101 compares the radius r1 of the circumscribed circle CC with a predetermined reference radius, and when the radius r1 is smaller than the reference radius, determines a magnitude of the moving speed in the partial path Rp3 to be a first speed. When the radius r1 is equal to or larger than the reference radius, the control part 101 determines the magnitude of the moving speed in the partial path Rp3 to be a second speed that is larger than the first speed.

The radius r1 of the circumscribed circle CC correlates with an angular difference between the partial path Rp3 and the partial path Rp4 and lengths of the partial path Rp3 and the partial path Rp4. For example, as illustrated in FIG. 7, when an angle θ1 formed by the partial path Rp3 and the partial path Rp4 is an obtuse angle, the smaller the angle θ1 is, and the shorter the lengths of the partial path Rp3 and the partial path Rp4 are, the smaller the radius r1 of the circumscribed circle CC is. When the angle θ is small or when the lengths of the partial path Rp3 and the partial path Rp4 are short, the discharge part 60 needs to more rapidly change the direction thereof in the partial path Rp3 and the partial path Rp4. Therefore, by determining a moving speed in the partial path Rp3 and the partial path Rp4 based on the radius r1 of the circumscribed circle CC as described above, it is more likely that the moving speed can be appropriately determined in consideration of an angular difference between partial paths and lengths of the partial paths.

Similarly, although not illustrated, in step S140, the control part 101 determines moving speeds in the partial paths Rp4 to Rp7 based on radii of corresponding circumscribed circles. For example, the moving speed in the partial path Rp4 is determined based on a radius of a circumscribed circle circumscribing the endpoints Ep4, Ep5, and Ep6. As described above, in the embodiment, in step S134, the control part 101 determines the moving speeds in the respective partial paths by repeatedly determining a moving speed in the first partial path in a circumscribed circle based on a radius of the circumscribed circle. More specifically, the "first partial path in a circumscribed circle" refers to a partial path that the discharge part 60 first reaches in the movement path Rt among partial paths coupling two consecutive endpoints in contact with the circumscribed circle, that is, a partial path closer to the starting end of the movement path Rt. In the examples in FIGS. 6 and 7, since there is no circumscribed circle circumscribing the endpoints Ep7, Ep8, and Ep9, the moving speed in the partial path Rp7 is determined based on a radius of a circumscribed circle circumscribing the endpoints Ep6, Ep7, and Ep8. That is, in the embodiment, the moving speed in the partial path Rp7 is determined similarly to the moving speed in the partial path Rp6 that is an immediately preceding partial path of the partial path Rp7. Accordingly, in the embodiment, the moving speeds in all the partial paths Rp3 to Rp7 determined as the first section Sc1 are determined to be the first speed.

In another embodiment, in step S140, for example, when there is at least one circumscribed circle having a radius smaller than the reference radius among circumscribed circles circumscribing at least three consecutive endpoints included in the first section Sc1, the control part 101 may determine the moving speeds in all the partial paths determined as the first section Sc1 to be the first speed. When there is no circumscribed circle having a radius smaller than the reference radius in the first section Sc1, the control part 101 may determine the moving speeds in all the partial paths determined as the first section Sc1 to be the second speed.

In step S150 in FIG. 5, the control part 101 determines a moving speed in the second section Sc2. In the embodiment, in step S150, the control part 101 determines the moving speed in the second section Sc2 to be the second speed.

In step S160, the control part 101 sets a speed change section for increasing or reducing the speed of the discharge part 60. In the embodiment, in step S160, when two partial paths in which the discharge part 60 has different moving speeds are continuous with each other, the control part 101 determines a partial path, in which the discharge part 60 has a larger moving speed, among the two partial paths as a speed change section. For example, in the example in FIG. 7, the control part 101 determines the partial path Rp2 and the partial path Rp8 as speed change sections, and generates a speed reduction command for reducing the moving speed at a predetermined constant acceleration from the second speed to the first speed in the partial path Rp2 and a speed increase command for increasing the moving speed at a predetermined constant acceleration from the first speed to the second speed in the partial path Rp8. The speed increase command or the speed reduction command may be, for example, a command for increasing or reducing the moving speed of the discharge part 60 from the middle of a partial path. In this case, a position at which the moving speed of the discharge part 60 starts to be increased or reduced may be determined based on, for example, the shortest distance for increasing or reducing the moving speed of the discharge part 60. The shortest distance is determined based on, for example, a difference in the moving speed of the discharge part 60 before and after speed increase or speed reduction, and an acceleration for increasing or reducing the moving speed of the discharge part 60.

In another embodiment, in step S160, the control part 101 may generate a new partial path for increasing or reducing the moving speed of the discharge part 60, for example, by dividing the partial path Rp2 or the partial path Rp8 into a plurality of new partial paths.

In step S170, the control part 101 executes a discharge amount determination process of determining discharge amounts in respective partial paths. In step S170, the control part 101 determines, as the discharge amounts, the amounts of the shaping material discharged from the discharge part 60 per unit time in the respective partial paths so as to achieve a predetermined lamination pitch and a predetermined line width, and generates discharge amount information indicating the discharge amounts in the respective partial paths. Accordingly, shaping data for shaping one layer of the three-dimensional shaped object is newly generated. The moving speed determined in the first processing described above may be included in, for example, the shaping data, or may be included in control data or the like different from the shaping data.

In the embodiment, in step S170, the control part 101 determines the discharge amount in each partial path based on a moving speed in the corresponding partial path determined in step S130 to step S160 so as to achieve the predetermined constant lamination pitch and the predetermined constant line width. Therefore, the discharge amount in a partial path for which the moving speed of the discharge part 60 is determined to be the first speed is smaller than the discharge amount in a partial path for which the moving speed of the discharge part 60 is determined to be the second speed. The discharge amount in a partial path set as the speed change section is determined so as to change with a change in the speed of the discharge part 60. In another embodiment, the control part 101 may execute discharge amount determination processing, for example, each time the control part 101 determines a moving speed in one partial path.

In step S180, the control part 101 determines whether the determination of the moving speeds and the discharge amounts in the movement path for shaping all layers of the three-dimensional shaped object is completed. When it is determined in step S180 that the determination of the moving speeds and the discharge amounts for all the layers is not completed, the control part 101 returns the processing to step S130. When it is determined in step S180 that the determination of the moving speeds and the discharge amounts for all the layers is completed, the control part 101 advances the processing to step S190. As described above, in the embodiment, the control part 101 repeatedly executes steps S130 to S170 to newly generate shaping data for shaping all layers of the three-dimensional shaped object.

In step S190, the control part 101 executes discharge processing. The discharging processing refers to processing of discharging the shaping material from the discharge part 60 in accordance with the moving speeds determined in the first processing to laminate layers. More specifically, in step S190, the control part 101 controls the shaping part 110, which includes the discharge part 60 and the plasticizing part 30, and the moving mechanism 230 in accordance with the determined moving speeds, the path information, and the discharge amount information to laminate the layers of the shaping material. Hereinafter, the discharge processing is also referred to as second processing. A process of discharging the shaping material from the discharge part 60 in accordance with the moving speeds determined in the first process to laminate layers, as in step S190, is also referred to as a second process.

The second process in the embodiment includes a flow rate control process and a rotation control process. The flow rate control process refers to a process of controlling the flow rate adjustment mechanism 70 and the pressure adjustment part 75 in accordance with the determined discharge amounts. The rotation control process refers to a process of controlling the rotation of the screw 40 based on a detection value of the pressure sensor 140. In the embodiment, in the second process, the rotation control process is executed in a partial path in which a fluctuation range of the moving speed of the discharge part 60 is within a predetermined range, and the flow rate control process is executed in a partial path in which the fluctuation range of the moving speed of the discharge part 60 exceeds the predetermined range. More specifically, in step S190, the control part 101 according to the embodiment executes the flow rate control process when the discharge part 60 moves on a partial path determined as the speed change section, and executes the rotation control process when the discharge part 60 moves on a partial path other than the partial path determined as the speed change section.

In the partial path Rp2 or the partial path Rp8 determined as the speed change section, for example, the control part 101 controls the flow rate adjustment mechanism 70 based on the discharge amounts determined in step S170 to adjust the opening degree of the flow path 69, and then determines whether a plunger of the flow rate adjustment mechanism 70 is at a predetermined assumed position based on a detection value of a position sensor (not illustrated) that detects a position of the plunger. The control part 101 retracts the plunger when the plunger is located forward of the assumed position, and advances the plunger when the plunger is located rearward of the assumed position. Accordingly, the flow rate of the shaping material in the flow path 69 and the pressure in the flow path 69 can be more precisely controlled, and thus the discharge amount can be more precisely controlled. Therefore, even when the moving speed of the discharge part 60 is increased or reduced in the partial path Rp2 or the partial path Rp8, it is possible to easily achieve a constant lamination pitch and a constant line width.

In the partial path Rp1 and the like other than the partial path Rp2 and the partial path Rp8, the control part 101 performs feedback control of the rotation of the screw 40 based on the detection value of the pressure sensor 140 such that a variation width of the detection value of the pressure sensor 140 falls within a predetermined range, for example. Since the moving speed of the discharge part 60 is constant in the partial path Rp1 and the like, it is possible to easily achieve a constant lamination pitch and a constant line width even without using the flow rate adjustment mechanism 70 or the pressure adjustment part 75 for adjusting the flow rate of the shaping material in the flow path 69.

According to the first embodiment described above, the three-dimensional shaping processing includes the first process of determining moving speeds of the discharge part 60 in respective partial paths based on arrangement of endpoints of a plurality of partial paths included in path information, and the second process of discharging the shaping material from the discharge part 60 while moving the discharge part 60 at the moving speeds determined in the first process to laminate layers. Therefore, it is possible to appropriately determine the moving speed based on the arrangement of the endpoints of the plurality of partial paths, and it is possible to shape a three-dimensional shaped object by moving the discharge part 60 at the determined moving speeds.

According to the embodiment, in the first process, the moving speed is determined based on a radius of a circumscribed circle circumscribing at least three consecutive endpoints on a movement path. Accordingly, the moving speed can be determined in consideration of a length of the partial path and an angular difference between partial paths.

Further, according to the embodiment, the moving speed in the first partial path of a circumscribed circle is determined based on a radius of the circumscribed circle. Accordingly, a moving speed in a certain partial path can be determined in consideration of an angular difference between the partial path and the next partial path and a length of the next partial path. In particular, by repeating the determination of a moving speed in the first partial path in a circumscribed circle based on a radius of the circumscribed circle, for example, a possibility that the moving speeds in the respective partials path can be appropriately determined is increased as compared with a case of repeating determination of both a moving speed in the first partial path and a moving speed in a subsequent partial path in a circumscribed circle based on a radius of the circumscribed circle.

According to the embodiment, the second process includes a flow rate control process of controlling the flow rate adjustment mechanism 70 and the pressure adjustment part 75 in accordance with discharge amounts and the moving speeds determined in the first process. Therefore, by executing the flow rate control process in the second process, it is possible to more precisely adjust the amount of the shaping material discharged from the discharge part 60.

According to the embodiment, the second process includes a rotation control process of controlling rotation of the screw 40 based on a detection value of the pressure sensor 140. Therefore, by executing the rotation control process in the second process, for example, the amount of the shaping material discharged from the discharge part 60 can be easily controlled even without controlling the flow rate adjustment mechanism 70 or the pressure adjustment part 75.

Further, according to the embodiment, in the second process, the rotation control process is executed in a partial path in which a fluctuation range of the moving speed is within a predetermined reference range, and the flow rate control process is executed in a partial path in which the fluctuation range of the moving speed exceeds the reference range. Accordingly, it is possible to more precisely adjust a discharge amount in a partial path in which the fluctuation range of the moving speed is larger, and it is possible to easily control a discharge amount in a partial path in which the fluctuation range of the moving speed is smaller.

B. Second Embodiment

FIG. 8 is a flowchart of three-dimensional shaping processing for implementing a method of manufacturing a three-dimensional shaped object according to a second embodiment. In the embodiment, differently from the first embodiment, the control part 101 determines a moving speed based on an angle formed by a plurality of partial paths continuous with each other instead of a radius of a circumscribed circle in the first processing. In FIG. 8, the same steps as those in FIG. 5 described in the first embodiment are denoted by the same reference signs as those in FIG. 5. Parts of the configuration of the three-dimensional shaping system 15 according to the embodiment that are not particularly described are the same as those of the first embodiment.

In the embodiment, step S155 and step S160 correspond to the first process, and processing executed by the control part 101 in step S155 and step S160 corresponds to the first processing.

In step S155, the control part 101 determines a moving speed based on an angle θ formed by two partial paths continuous with each other. More specifically, when the angle θ is equal to or smaller than a predetermined reference angle, the control part 101 determines a moving speed in a partial path of the two partial paths, which the discharge part 60 reaches earlier, to be the first speed. In addition, when the angle θ exceeds the reference angle, the control part 101 determines the moving speed in the partial path, which the discharge part 60 reaches earlier, to be the second speed. Since the partial path Rp9 is the last partial path in the movement path Rt, a moving speed in the partial path Rp9 is determined based on an angle formed by the partial paths Rp8 and Rp9. That is, in the embodiment, the moving speed in the partial path Rp9 is determined in the same manner as a moving speed in the partial path Rp8. Accordingly, in the example of the movement path Rt illustrated in an upper part of FIG. 6, moving speeds in the partial paths Rp3 to Rp6 are determined to be the first speed, and moving speeds in the partial paths Rp1, Rp2, and Rp7 to Rp9 are determined to be the second speed. In step S160 in the embodiment, the partial path Rp2 and the partial path Rp7 are set as speed change sections.

According to the second embodiment described above, in the first process, moving speeds in respective partial path are determined based on an angle formed by a plurality of partial paths continuous with each other. Therefore, the moving speeds in the respective partial paths can be determined by simple control.

C. Other Embodiments (C1) In the first embodiment, two or more radii may be determined stepwise as the reference radius. For example, in the examples in FIGS. 6 and 7, when the radius r1 of the circumscribed circle CC is smaller than a first reference radius, the moving speed in the partial path Rp3 may be determined to be a first moving speed, when the radius r1 is equal to or larger than the first reference radius and smaller than a second reference radius, the moving speed in the partial path Rp3 may be determined to be a second moving speed, and when the radius r1 is equal to or larger than the second reference radius, the moving speed in the partial path Rp3 may be determined to be a third moving speed larger than the second moving speed.

(C2) In the first embodiment, the moving speed is determined based on a result of comparison between the radius of a circumscribed circle and the reference radius, and alternatively the moving speed may be determined without comparing the radius of the circumscribed circle with the reference radius. For example, the control part 101 may determine the moving speed based on a predetermined relationship between the radius of a circumscribed circle and the moving speed. In this case, the relationship between the radius of a circumscribed circle and the moving speed is determined by an experiment, for example, as a relationship between the radius of a circumscribed circle and a moving speed at which the discharge part 60 can move faster without deviating from a path assumed when the discharge part 60 moves along a partial path coupling endpoints in contact with the circumscribed circle.

(C3) In the first embodiment, the moving speed in the first partial path of a circumscribed circle is determined based on a radius of the circumscribed circle. On the other hand, based on the radius of the circumscribed circle, not the moving speed in the first partial path in the circumscribed circle but a moving speed in a partial path subsequent to the first partial path may be determined. For example, in the example in FIG. 7, based on the radius of the circumscribed circle CC, the moving speed in the partial path Rp4 may be determined instead of the moving speed in the partial path Rp3. Further, based on the radius of one circumscribed circle, both the moving speed in the first partial path and the moving speed in the subsequent partial path in the circumscribed circle may be determined.

(C4) In the second embodiment, the moving speed is determined based on a result of comparison between the angle θ and the reference angle, and alternatively the moving speed may be determined without comparing the angle θ with the reference angle. For example, the control part 101 may determine the moving speed based on a predetermined relationship between the angle θ and the moving speed. In this case, the relationship between the angle θ and the moving speed is determined by an experiment, for example, as a relationship between the angle θ and a moving speed at which the discharge part 60 can move faster without deviating from a path assumed when the discharge part 60 moves along two partial paths forming the angle θ.

(C5) In the above embodiments, the control part 101 newly generates the shaping data by executing the first processing and speed determination processing. On the other hand, the control part 101 may not newly generate the shaping data by executing the first processing and the speed determination processing, and may update discharge amount information of predetermined shaping data, for example. In this case, for example, in the three-dimensional shaping processing in FIG. 5, the control part 101 acquires the shaping data instead of acquiring the shape data in step S110. Next, the control part 101 omits step S120, and in steps S130 to S160, determines moving speeds in respective partial paths based on path information included in the shaping data generated in advance. Then, in step S170, the control part 101 updates discharge amount information included in the shaping data generated in advance, by determining discharge amounts in the respective partial paths based on the moving speeds determined in steps S130 to S160.

(C6) In the above embodiments, the discharge amounts are determined as the amounts of the shaping material discharged per unit time in the respective partial paths. On the other hand, the discharge amount may be determined for each partial path as a total amount of the shaping material discharged in the entire partial path. In this case, in the discharge amount determination processing, the control part 101 may determine the discharge amounts in the respective partial paths as, for example, total amounts of the shaping material for achieving a constant lamination pitch and a constant line width in the respective partial paths. In this case, in the flow rate control process in the second process, for example, the control part 101 adjusts the flow rate adjustment mechanism 70 and the pressure adjustment part 75 based on determined discharge amounts and moving speeds so that the amount of the shaping material discharged from the discharge part 60 per unit movement amount in each partial path is constant. Accordingly, the shaping material can be discharged from the discharge part 60 so as to achieve a constant lamination pitch and a constant line width in the same manner as described in the first embodiment.

(C7) In the above embodiments, the second process includes the flow rate control process. On the other hand, the second process may not include the flow rate control process. In this case, the three-dimensional shaping system 15 may not include the flow rate adjustment mechanism 70 and the pressure adjustment part 75.

(C8) In the above embodiments, the second process includes the rotation control process. On the other hand, the second process may not include the rotation control process. In this case, the three-dimensional shaping system 15 may not include the pressure sensor 140. Further, in this case, for example, the plasticizing part 30 may plasticize a material to generate the shaping material by rotating an in-line screw. Further, in this case, the shaping part 110 may be configured as a head that plasticizes a filament-shaped material and discharges the plasticized material.

(C9) In the above embodiments, in the second process, the rotation control process is executed in the partial path in which the fluctuation range of the moving speed is within the reference range, and the flow rate control process is executed in the partial path in which the fluctuation range of the moving speed exceeds the reference range. On the other hand, in the second process, for example, the flow rate control process may be executed in a partial path in which the moving speed is equal to or larger than a predetermined reference speed in addition to or instead of the partial path in which the fluctuation range of the moving speed is within the reference range. In this case, the rotation control process may be executed in a partial path other than the partial path in which the flow rate control process is executed. Further, for example, in the second process, the rotation control process may be executed in a partial path in which the moving speed is smaller than the predetermined reference speed in addition to or instead of the partial path in which the fluctuation range of the moving speed exceeds the reference range. In this case, the flow rate control process may be executed in a partial path other than the partial path in which the rotation control process is executed.

(C10) In the above embodiments, the control part 101 executes the first processing, the second processing, and speed determination processing. However, the first processing, the second processing, and the speed determination processing may be performed by different control parts in the three-dimensional shaping system 15. In this case, for example, the second processing may be executed by the control part of the three-dimensional shaping device 100, and the first processing and the speed determination processing may be executed by a control part of an information processing device or the like separate from the three-dimensional shaping device 100.

(C11) In the above embodiments, a pellet-shaped ABS resin material is used as a raw material to be supplied to the material supply part 20. On the other hand, the three-dimensional shaping device 100 can shape the three-dimensional shaped object by using various materials such as a thermoplastic material, a metal material, and a ceramic material as a main material. Here, the "main material" refers to a material serving as a center component for forming a shape of the three-dimensional shaped object, and refers to a material having a content of 50% or more by weight in the three-dimensional shaped object. The above-described shaping material includes a material obtained by melting the main material alone, and a material obtained by melting the main material and a part of components contained in the main material into a paste form.

When the thermoplastic material is used as the main material, the shaping material is generated by plasticizing the material in the plasticizing part 30. "Plasticizing" means applying heat to the thermoplastic material to melt the material.

For example, the following thermoplastic resin materials can be used as the thermoplastic material.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, and polyether ether ketone Additives such as a pigment, a metal, a ceramic, a wax, a flame retardant, an antioxidant, and a heat stabilizer may be mixed into the thermoplastic material. In the plasticizing part 30, the thermoplastic material is plasticized and converted into a molten state by the rotation of the screw 40 and the heating of the heater 58. The shaping material generated by melting of the thermoplastic material is discharged from the nozzle 61, and then is cured due to a decrease in temperature.

It is desirable that the thermoplastic material is discharged from the nozzle 61 in a state of being melted completely by being heated to a temperature equal to or higher than a glass transition point thereof. For example, a glass transition point of the ABS resin is about 120° C., and it is desirable that the ABS resin is discharged from the nozzle 61 at about 200° C.

In the three-dimensional shaping device 100, for example, the following metal materials may be used as the main material instead of the thermoplastic materials described above. In this case, it is desirable that a component to be melted at the time of generating the shaping material is mixed with a powder material obtained by converting the following metal material into a powder, and the mixture is put into the plasticizing part 30 as a raw material.

Examples of Metal Material

Single metals such s as magnesium (Mg), iron (Fe), cobalt (Co), chromium (Cr), aluminum (Al), titanium (Ti), copper (Cu), and nickel (Ni), or an alloy containing one or more of these metals Examples of Alloy Maraging steel, stainless steel, cobalt chromium molybdenum, titanium alloy, nickel alloy, aluminum alloy, cobalt alloy, and cobalt chromium alloy In the three-dimensional shaping device 100, a ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material disposed on the stage 210 may be cured by, for example, sintering with laser irradiation or warm air.

A powder material of the metal material or the ceramic material to be put into the material supply part 20 as the raw material may be a mixed material in which a plurality of types of powders of single metals or alloys are mixed or a mixed material in which a plurality of types of powders of ceramic materials are mixed. The powder material of the metal material or the ceramic material may be coated with, for example, a thermoplastic resin listed in the above-described examples, or a thermoplastic resin other than those listed in the above-described examples. In this case, the thermoplastic resin may be melted to exhibit fluidity in the plasticizing part 30.

For example, the following solvents may be added to the powder material of the metal material or the ceramic material to be put into the material supply part 20 as the raw material. One solvent or a combination of two or more solvents selected from the following solvents may be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as a dimethyl sulfoxide solvent and a diethyl sulfoxide solvent; pyridine-based solvents such as a pyridine solvent, a γ-picoline solvent, and a 2,6-lutidine solvent; tetraalkylammonium acetate (for example, tetrabutylammonium acetate); and ionic liquids such as butyl carbitol acetate In addition, for example, the following binders may be added to the powder material of the metal material or the ceramic material to be put into the material supply part 20 as the raw material.

Examples of Binder

Acrylic resin, epoxy resin, silicone resin, cellulose-based resin or other synthetic resins, polylactic acid (PLA), polyamide (PA), polyphenylene sulfide (PPS), polyetheretherketone (PEEK) or other thermoplastic resins D. Other Aspects The present disclosure is not limited to the above-described embodiments, and can be implemented in various aspects without departing from the spirit of the present disclosure. For example, the present disclosure can be implemented in the following aspects. In order to solve a part of or all of problems of the present disclosure, or in order to achieve a part of or all of effects of the present disclosure, technical features of the above embodiments corresponding to technical features in the following aspects can be replaced or combined as appropriate. The technical features can be appropriately deleted unless described as essential in the present specification.

(1) According to a first aspect of the present disclosure, a method of manufacturing a three-dimensional shaped object is provided. The method of manufacturing a three-dimensional shaped object includes: a first process of determining a moving speed of a discharge part in each of a plurality of partial paths based on an arrangement of endpoints representing a start point and an end point of the plurality of partial paths, the arrangement of the endpoints being included in path information in which a movement path in which the discharge part moves while discharging a shaping material toward a stage is indicated by the plurality of partial paths; and a second process of discharging the shaping material from the discharge part while moving the discharge part at the determined moving speed to laminate layers.

According to this aspect, it is possible to appropriately determine the moving speed of the discharge part based on the arrangement of the endpoints of the plurality of partial paths, and it is possible to shape a three-dimensional shaped object by moving the discharge part at the determined moving speed.

(2) In the above aspect, in the first process, the moving speed may be determined based on a radius of a circumscribed circle circumscribing at least three consecutive endpoints on the movement path. According to this aspect, the moving speed of the discharge part can be determined in consideration of a length of the partial path and an angular difference between partial paths that are continuous with each other.

(3) In the above aspect, the moving speed in the partial path of the movement path which the discharge part reaches first, among the partial paths each coupling two consecutive endpoints in contact with the circumscribed circle, may be determined based on the radius of the circumscribed circle. According to this aspect, the moving speed in a certain partial path can be determined in consideration of an angular difference between the partial path and the next partial path and a length of the next partial path. Therefore, it is more likely that the moving speeds in the respective partial paths can be appropriately determined.

(4) In the above aspect, in the first process, the moving speed may be determined based on an angle formed by two partial paths that are continuous with each other. According to this aspect, the moving speed can be determined by simple control.

(5) In the above aspect, the method of manufacturing a three-dimensional shaped object may further include a process of determining a discharge amount of the shaping material from the discharge part in each of the partial paths, and the second process may include a flow rate control process of controlling, based on the determined discharge amount, a flow rate adjustment mechanism configured to adjust an amount of the shaping material flowing through a flow path and a pressure adjustment part configured to adjust a pressure in the flow path. According to this aspect, by executing the flow rate control process in the second process, it is possible to more precisely adjust the discharge amount of the shaping material from the discharge part.

(6) In the above aspect, the discharge part may include a plasticizing part configured to generate the shaping material and a pressure sensor configured to detect a pressure in a flow path through which the shaping material flows. The plasticizing part may include a screw that has a groove forming surface, in which a groove is formed, and that rotates, and a barrel that has a facing surface facing the groove forming surface and has a communication hole formed in the facing surface. The second process may include a rotation control process of controlling rotation of the screw based on a detection value of the pressure sensor. According to this aspect, by executing the rotation control process in the second process, it is possible to easily control the discharge amount of the shaping material from the discharge part.

(7) In the above aspect, in the second process, the rotation control process may be executed in the partial path in which a fluctuation range of the moving speed of the discharge part is within a predetermined reference range, and the flow rate control process may be executed in the partial path in which the fluctuation range exceeds the reference range. According to this aspect, it is possible to more precisely adjust the discharge amount of the shaping material in the partial path in which the fluctuation range of the moving speed is larger, and it is possible to easily control the discharge amount of the shaping material in the partial path in which the fluctuation range of the moving speed is smaller.

(8) According to a second aspect of the present disclosure, a three-dimensional shaping system is provided. The three-dimensional shaping system includes: a stage; a discharge part configured to discharge a shaping material toward the stage; a moving mechanism configured to change a relative position between the discharge part and the stage; and a control part. The control part executes first processing of determining a moving speed of the discharge part in each of a plurality of partial paths based on an arrangement of endpoints representing a start point and an end point of the plurality of partial paths, the arrangement of the endpoints being included in path information in which a path in which the discharge part moves while discharging the shaping material is indicated by the plurality of partial paths, and second processing of discharging the shaping material from the discharge part while moving the discharge part at the determined moving speed to laminate layers.

What is claimed is:

1. A method of manufacturing a three-dimensional shaped object, the method comprising:
   determining a moving speed of a discharge part in each of a plurality of partial paths based on an arrangement of endpoints representing a start point and an end point of the plurality of partial paths, the arrangement of the endpoints being included in path information on a movement path for the discharge part to discharge a shaping material toward a stage, the movement path being defined by the plurality of partial paths;
   setting a speed change section for increasing or reducing the moving speed of the discharge part to one partial path of two continuous partial paths among the plurality of partial paths, upon determining different moving speeds of the discharge part in the two continuous partial paths, the one partial path being a path in which the moving speed of the discharge part is determined to be faster than that in the other partial path of the two continuous partial paths;
   generating a speed increase/reduction command to commence increasing or reducing the moving speed of the discharge part at a predetermined constant acceleration from a point between the start point and the end point of the one partial path set as the speed change section; and
   discharging the shaping material from the discharge part while moving the discharge part based on the determined moving speed and the speed increase/reduction command to laminate layers.

2. The method of manufacturing a three-dimensional shaped object according to claim 1, wherein
   the moving speed is determined based on a radius of a circumscribed circle circumscribing at least three consecutive endpoints of three consecutive partial paths among the plurality of partial paths on the movement path.

3. The method of manufacturing a three-dimensional shaped object according to claim 2, wherein
the moving speed in a partial path among the three consecutive partial paths which the discharge part reaches first is determined based on the radius of the circumscribed circle.

4. The method of manufacturing a three-dimensional shaped object according to claim 1, wherein
the moving speed is determined based on an angle formed by two partial paths that are continuous with each other among the plurality of partial paths.

5. The method of manufacturing a three-dimensional shaped object according to claim 1, further comprising:
determining a discharge amount of the shaping material from the discharge part in each of the partial paths, wherein
the discharging of the shaping material includes a flow rate control process of controlling, based on the determined discharge amount, a flow rate adjustment mechanism configured to adjust an amount of the shaping material flowing through a flow path and a pressure adjustment part configured to adjust a pressure in the flow path.

6. The method of manufacturing a three-dimensional shaped object according to claim 1, wherein
the discharge part includes a plasticizing part configured to generate the shaping material and a pressure sensor configured to detect a pressure in a flow path through which the shaping material flows,
the plasticizing part includes a screw that has a groove forming surface, in which a groove is formed, and that rotates, and a barrel that has a facing surface facing the groove forming surface and has a communication hole formed in the facing surface, and
the discharging of the shaping material includes a rotation control process of controlling rotation of the screw based on a detection value of the pressure sensor.

7. The method of manufacturing a three-dimensional shaped object according to claim 6, wherein
in the discharging of the shaping material,
the rotation control process is executed in a partial path among the plurality of partial paths in which a fluctuation range of the moving speed is within a predetermined reference range, and
a flow rate control process is executed in a partial path among the plurality of partial paths in which the fluctuation range exceeds the reference range.

8. The method of manufacturing a three-dimensional shaped object according to claim 1, wherein
the point between the start point and the end point of the one partial path is determined based a difference between the moving speed of the discharge part before being increased or reduced and the moving speed of the discharge part after being increased or reduced, and an acceleration for increasing or reducing the moving speed of the discharge part.

\* \* \* \* \*